United States Patent [19]
Engel

[11] 3,884,283

[45] May 20, 1975

[54] TIRE CHAIN

[76] Inventor: Stewart L. Engel, 305 S. Warminster Rd., Hatboro, Pa. 19040

[22] Filed: Dec. 5, 1973

[21] Appl. No.: 422,120

[52] U.S. Cl. ............................. 152/213 A; 152/241
[51] Int. Cl. ............................................. B60c 27/00
[58] Field of Search.... 152/170, 171, 213 R, 213 A, 152/217, 218, 219, 225, 231, 233, 239–242; 254/65; 24/68 TT; 81/15.8

[56] References Cited
UNITED STATES PATENTS

| | | | |
|---|---|---|---|
| 1,204,919 | 11/1916 | Wightman | 254/65 |
| 1,935,035 | 11/1933 | Levi | 152/213 A |
| 2,130,293 | 9/1938 | Bonforte | 152/242 |
| 2,363,998 | 11/1944 | Royer | 152/213 A |
| 3,752,204 | 8/1973 | Ouellette | 152/213 A |

Primary Examiner—Robert B. Reeves
Assistant Examiner—Larry H. Martin
Attorney, Agent, or Firm—Allen V. Hazeltine

[57] ABSTRACT

An improved tire chain and method for ready attachment thereof in which a flexible cable, having one end connected to the end of one side chain and having its other end provided with a hook for connection to a link of the other side chain, is passed through closed-link retaining elements affixed to corresponding ends of said side chains and portions of said cable are adapted to be passed over open-link retaining elements affixed to the opposite ends of said side chains to provide for optimum application of force between opposite ends of the side chains in a manner to insure secure attachment of the tire chains to the tire and to facilitate application of the tire chain to the tire.

5 Claims, 4 Drawing Figures

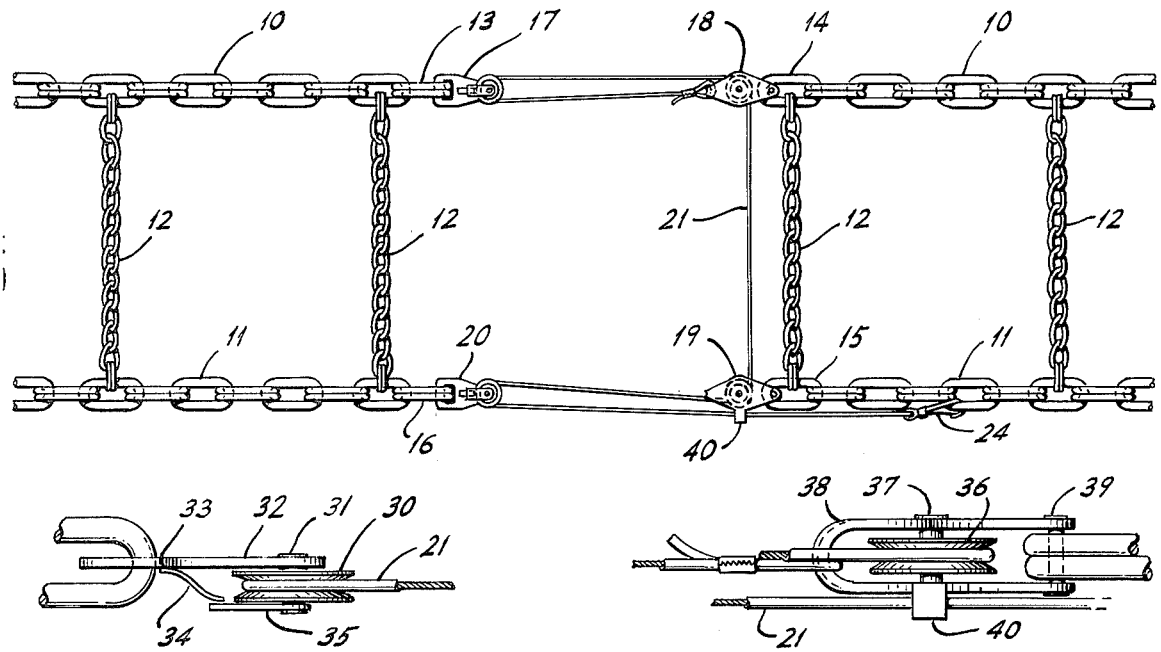
FIG. 1.
FIG. 1A.
FIG. 1B.
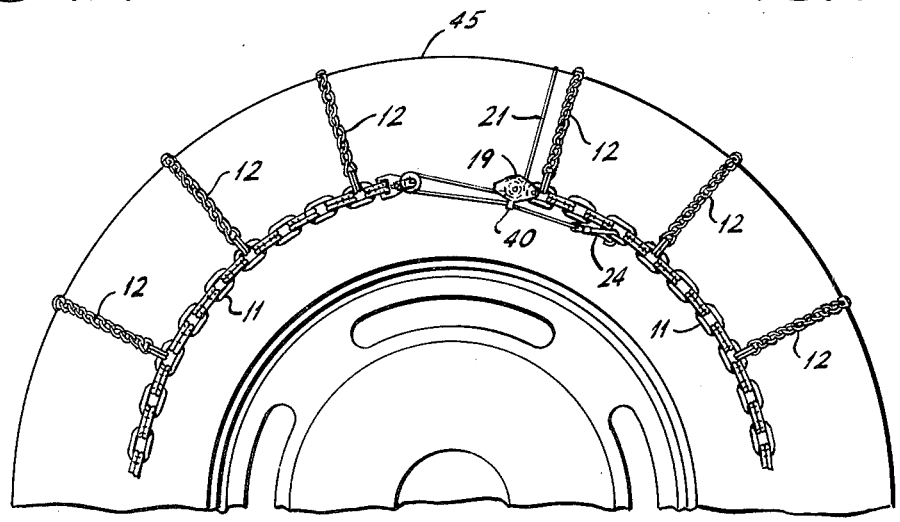
FIG. 2.

TIRE CHAIN

This invention relates to improvements in tire chains of the sort commonly used for enhancing the traction of automobile tires, and more particularly to an improved arrangement of and method for securing such tire chains to tires.

The object of the invention is to provide an improved arrangement and method for more conveniently and securely fastening a tire chain on a tire.

The invention will be more fully understood from consideration of the following detailed description with reference to the accompanying drawing in which:

FIG. 1 is a fragmentary plan view showing a portion of a tire chain embodying the present invention, FIG. 1A is a detailed showing of a preferred form of the retaining elements 17 and 20 of FIG. 1, FIG. 1B is a detailed showing of a preferred form of the retaining elements 18 and 19 of FIG. 1, and FIG. 2 is a side elevation view showing the tire chain in accordance with the invention positioned on an automobile tire.

Referring to FIG. 1, there is shown a tire chain comprising two side chains 10 and 11 adapted to be positioned in circular form at opposite sides of a tire, and tread chains 12 connecting said side chains and adapted to extend over the tread of the tire.

In accordance with the invention, to corresponding ends 13 and 16 of each of side chains 10 and 11 are attached open-link retaining elements 17 and 20, which may comprise any suitable form of open link or hook, but which preferably, as shown, comprise open-faced pulleys as shown more clearly in the detailed drawing of FIG. 1A. Although retaining elements 17 and 20 are effectively open so as to permit cables to be placed over them, as will be explained hereinafter they may be provided with spring closure means for maintaining the cables in place after they have been positioned in the retaining elements. To the opposite ends 14 and 15 of each of the side chains 10 and 11 are attached permanently closed-link retaining elements 18 and 19 which may comprise any suitable form of closed link or hook, but which preferably, as shown, comprise closed-faced pulleys as shown more clearly in the detail drawing of FIG. 1B. Also, in accordance with the invention, there is provided a flexible cable 21, one end of which is permanently attached to the end of said chain 10 near closed-link retaining element 18 in any suitable manner, but preferably by attaching it to one end of the housing of closed-faced pulley 18, for example by means of a loop in cable 21 secured by a conventional compression-type cable clamp. This cable may be of any suitable type adapted to provide high strength and flexibility, such as a conventional stranded wire cable of stainless or galvanized steel, and if desired may be coated with suitable plastic to protect it against corrosion and, if ordinary hooks are used for retaining elements 17 – 20, to decrease friction when it is pulled through said hooks. To the opposite end of cable 21 is attached a hook 24 for engaging and securing that end of the cable to one of the links of side chain 11. Hook 24 likewise may be secured to the end of cable 21 by a loop in the cable secured by a conventional compression-type cable clamp and preferably is a snap hook of conventional type having a leaf spring to prevent disengagement of the hook from the side chain.

As shown in FIG. 1A, the preferred form of retaining elements 17 and 20 is an open-faced pulley comprising a sheave 30 rotating on a pin 31 suitably affixed to a plate 32 provided with a hole 33 for attaching the pulley assembly to the end links 13 and 16 of side chains 10 and 11, which end links may be split links to permit convenient attachment of the pulley assemblies thereto. Preferably plate 32 may have affixed thereto a spring closure means 34 normally extending to and contacting side plate 35 to keep cable 21 in place on the pulley in the event that said cable should become slack.

As shown in FIG. 1B, the preferred form of retaining elements 18 and 19 is a closed-faced pulley comprising a sheave 36 rotating on a pin 37 suitably affixed to a housing 38 which may be provided with a pin 39 passing through holes in the open end thereof for fastening it to the end links of side chains 10 and 11. As shown in FIGS. 1 and 2, housing 38 also may be provided with a hook 40 for engaging and restraining the portion of cable 21 adjacent snap hook 24. Hook 40 may be omitted in the form of pulley used at 18 in FIG. 1.

In applying the tire chain to a tire, it is first placed in position around the circumference of a tire in the usual fashion, and then portions of the flexible cable 21 are passed over the sheaves of pulleys 17 and 20. The hook-end of the cable 21 is then drawn tight by the user to bring the tread chains 12 into intimate contact with the tire on its tread and to draw the ends 13, 14, 15 and 16 of side chains 10 and 11 as closely together as possible. The free portion of cable 21 is passed through hook 40 and hook 24 at the free end of cable 21 is then secured to the closest link in side chain 11 to hold the entire tire chain assembly permanently in position on the tire as shown in the elevation view of FIG. 2. The ultimate disposition of the tire chain on a tire 45 is as shown in FIG. 2. It will be noted that the flexible cable 21 passes from pulley 18 on the inside side chain 10 directly across the tread of the tire to pulley 19 connected to the outside side chain 11 and, since it is positioned relatively close to one of the tread chains 12, will not be subjected to appreciable wear as the tire rotates in contact with the road surface. Furthermore, as will be evident, the open-faced pulleys or other suitable open-faced retaining elements on the ends 13 and 16 of side chains 10 and 11 facilitate positioning the flexible cable 21 over the sheaves thereof so as to make possible convenient installation of the tire chain even by a person wearing gloves or mittens since no threading of the cable 21 through closed loops is required. Moreover, the manner of lacing the cable as shown provides for the optimum application of force between the ends of side chains 10 and 11 to insure that the tire chain assembly will be held securely in position on the tire. The present invention differs in these respects from prior art arrangements using closed links through which a cable must be threaded and in which the lacing of the cable is done in such a manner as to tend to draw the ends of the side chains towards each other in a manner which is not adapted to hold the assembly in position on the tire as securely as is possible with the present arrangement. I am aware, for example, of tire chain securing arrangements of the sort shown in U.S. Pat. No. 1,935,035 granted Nov. 14, 1933 to P. Levi, which are not adapted to provide such advantageous results achievable by the present arrangement.

While I have described my invention with reference to a particular preferred embodiment, it will be understood that certain modifications may be made therein

I claim:

1. A tire chain, comprising two side chains adapted to be positioned in circular form at opposite sides of a tire and tread chains connecting said side chains and adapted to extend over the tread of the tire, permanently closed-link retaining elements connected to corresponding ends of each of said side chains, open-link retaining elements connected to the opposite ends of each of said side chains, and a flexible cable having one end secured to the end of a first one of said side chains to which one of said closed-link retaining elements is connected and having a snap hook connected to its other end, said cable passing through said closed-link retaining element connected to the end of said first side chain to which the end of said cable is connected to form a loop therein whereby the loop formed in said flexible cable is placed over the open-link retaining element at the end of said first side chain and then said flexible cable is passed across the tread of said tire and thence passing through the closed-link retaining element at the end of the second of said side chains, and the portion of said flexible cable between said second closed-link retaining element and said snap hook is passed over the open-link retaining element at the end of said second side chain, said cable is then pulled tight to position the tire chain in contact with the tire, and the free end thereof is secured by fastening said snap hook to a link of said second side chain.

2. An arrangement according to claim 1 in which said closed-link retaining elements comprise closed-face pulleys and said open-link retaining elements comprise open-face pulleys.

3. An arrangement according to claim 2 in which the end of said flexible cable is attached to an end of the open-face pulley whose opposite end is connected to the end of said first side chain.

4. An arrangement according to claim 2 in which said open-face pulleys are provided with a spring closure means for preventing disengagement of said flexible cable from said pulley.

5. An arrangement according to claim 2 in which said closed-face pulley connected to the end of said second side chain is provided with a hook adapted to receive and restrain the portion of said flexible cable near the end to which said snap hook is attached.

* * * * *